United States Patent [19]

Jernigan et al.

[11] 4,083,934

[45] Apr. 11, 1978

[54] PROCESS FOR OBTAINING PURE ORTHOPHOSPHORIC ACID FROM SUPERPHOSPHORIC ACID

[75] Inventors: John D. Jernigan; Brooks M. Whitehurst, both of New Bern, N.C.

[73] Assignee: Texasgulf Inc., Stamford, Conn.

[21] Appl. No.: 760,261

[22] Filed: Jan. 18, 1977

Related U.S. Application Data

[63] Continuation-in-part of Ser. No. 577,908, May 15, 1975, abandoned.

[51] Int. Cl.² ............................................. C01B 25/16
[52] U.S. Cl. .................................. 423/317; 423/321 R
[58] Field of Search .................. 423/316, 317, 321 R, 423/321 S

[56] References Cited

U.S. PATENT DOCUMENTS

| | | | |
|---|---|---|---|
| 1,283,398 | 10/1918 | Carothers et al. | 423/317 |
| 1,451,786 | 4/1923 | Ross et al. | 423/321 |
| 2,169,588 | 8/1939 | Malovan | 423/317 |
| 3,284,171 | 11/1966 | Harper | 423/317 |
| 3,853,486 | 12/1974 | Heymer et al. | 423/321 |

FOREIGN PATENT DOCUMENTS

| | | | |
|---|---|---|---|
| 1,035,114 | 2/1958 | Germany | 423/321 |
| 805,517 | 12/1959 | Germany | 423/316 |
| 4,414,692 | 6/1969 | Japan | 423/321 |
| 4,212,050 | 3/1967 | Japan | 423/321 |

OTHER PUBLICATIONS

Canadian Journal of Chemistry–vol. 34–1956–Compositioned Strong Phosphoric Adids–pp. 785 to 797.
Agricultural & Food Chemistry–vol. 22, #6–p. 1099t–Kim et al.
Ind. Eng. Chem., Process Des. Develop.
Phosphoric Acid–Slack–vol. 1–pt. 1–pp. 148, 149.
Ind. & Eng. Chem.–vol. 17, #10–pp. 1081 to 1083–Ross et al.

*Primary Examiner*—O. R. Vertiz
*Assistant Examiner*—Eugene T. Wheelock

[57] ABSTRACT

A process for obtaining pure orthophosphoric acid from superphosphoric acid is provided comprising:

(a) hydrolyzing superphosphoric acid with water until a mixture of polyphosphoric acids and orthophosphoric acid is formed, wherein the total $P_2O_5$ content of said mixture is from 65% to 70% and the poly $P_2O_5$ content of said mixture is from 1% to 15% of the total $P_2O_5$;

(b) crystallizing said orthophosphoric acid from said mixture;

(c) separating said orthophosphoric acid from said mixture; and (d) washing said orthophosphoric acid with an organic solvent having a low or limited solubility for orthophosphoric acid.

18 Claims, No Drawings

PROCESS FOR OBTAINING PURE ORTHOPHOSPHORIC ACID FROM SUPERPHOSPHORIC ACID

CROSS REFERENCE TO RELATED APPLICATIONS

This application is a continuation-in-part of application Ser. No. 577,908 filed May 15, 1975 now abandoned.

BACKGROUND OF THE INVENTION

This invention is concerned with a method for obtaining substantially pure orthophosphoric acid from superphosphoric acid.

orthophosphoric acid, $H_3PO_4$, has found use in a wide variety of industrial and commercial applications such as for the production of phosphates in soaps and detergents, for pickling and rust-proofing metals, in pharmaceuticals and in beverages to name a few. orthophosphoric acid is prepared commercially by two different methods; the thermal method and the wet-process method.

In the thermal method, phosphate rocks are smelted in a furnace at high temperatures to produce phosphorus vapor which escapes from the furnace as a gas. The gas is condensed to produce elemental phosphorus which is then burned with dry air and absorbed in water to produce orthophosphoric acid.

In the wet process method, a phosphorus-containing material is treated with a mineral acid such as sulfuric acid to liberate orthophosphoric acid which is then filtered to remove the calcium salt (gypsum), clarified and concentrated as required by the particular industry.

Superphosphoric acid is formed upon concentration of orthophosphoric acid. Superphosphoric acid is a liquid containing a mixture of orthophosphoric acid and polyphosphoric acids such as pyrophosphoric, tripolyphosphoric acid and higher poly acids which on dilution with water hydrolyze to orthophosphoric acid. Superphosphoric is used for manufacturing liquid fertilizers where the polyphosphates act as a sequestering agent for metallic impurities. Generally, superphosphoric acid is classified on the basis of its $P_2O_5$ content. For example, a commercial superphosphoric acid may contain 69–72% $P_2O_5$ and about 20–60% poly $P_2O_5$. The percent $P_2O_5$ refers to the total $P_2O_5$ content of the superphosphoric acid while the percent poly $P_2O_5$ refers to the percent of the total $P_2O_5$ in the polyphosphoric acid form. As used herein, the term superphosphoric acid applies to any mixture of orthophosphoric acid and polyphosphoric acid or acids containing at least 62% $P_2O_5$ and 1% poly $P_2O_5$.

It is important in many applications to employ substantially pure orthophosphoric acid. Unfortunately in the wet-process method, phosphoric acid is not obtained in a pure state and contains significant amounts of inorganic impurities such as calcium phosphate, calcium sulfate and compounds of iron, aluminum, chromium, vanadium and magnesium. Among the prior art processes used for purifying phosphoric acid obtained by the wet-process method include organic solvent extraction, impurity precipitation, ion-exchange crystallization.

Both the solvent extraction and impurity precipitation methods produce significant amounts of by-product phosphate as impure acid or salts which must be disposed of. Solvent extraction may also leave carbonaceous residues which discolor the product acid and can be dangerous to use. Moreover, the product must be concentrated by evaporation of water which involves costly heat energy expenditure. Ion-exchange methods also require product evaporation and their commercial usage is questionable. Crystallization of phosphoric acid has previously required concentration of dilute phosphoric acid to about 68–70% $P_2O_5$, while insuring that polyphosphoric acid species are not formed. For this reason industrial use of the crystallization method has not materialized.

The instant invention, provides an economical and efficient method for obtaining substantially pure orthophosphoric acid which method avoids the problems of water evaporation and concentration and presents no safety problems as in solvent extraction.

SUMMARY OF THE INVENTION

The instant method provides a process for obtaining pure orthophosphoric acid from superphosphoric acid comprising:

(a) hydrolyzing superphosphoric acid with water until a mixture of polyphosphoric acids and orthophosphoric acid is formed, wherein the total $P_2O_5$ content of said mixture is from 65 to 70% and the poly $P_2O_5$ content of said mixture is from 1% to 15% of the total $P_2O_5$;

(b) crystallizing said orthophosphoric acid from said mixture;

(c) separating said orthophosphoric acid from said mixture; and (d) washing said orthophosphoric acid with an organic solvent having a low or limited solubility for orthophosphoric acid.

DESCRIPTION OF THE PREFERRED EMBODIMENTS

In a typical procedure, a superphosphoric acid having a concentration of for example 71% $P_2O_5$ is first hydrolyzed by heating with water until an acid mixture of orthophosphoric acid and low poly phosphoric acids containing about 65–70% $P_2O_5$ and from 1% to about 15% poly $P_2O_5$ is formed. The heating is of sufficient time and temperature to stoichiometrically hydrolyze the superphosphoric acid with the added water. If the heating is conducted at 175° F, for example, about 90% of the theoretical hydrolysis will occur within 30 minutes. Next this hydrolyzed acid mixture is cooled to about 85°–90° F and fed into a crystallizer, where it is further cooled to less than about 75° F. Normally, 60°–65° F is adequate but lower temperatures can be used. In general, the lower the temperature, the faster the rate of crystal nucleation. The highly pure orthophosphoric acid can be crystallized from the mixture after a period of from 1.5 to 10.0 hours depending on the temperature and acid concentration. The crystallized orthophosphoric acid is then separated from the acid mixture by for example, centrifugation. The raw crystals can be rinsed with a purified phosphoric acid solution or an organic solvent such as an alcohol having a low or limited solubility for phosphoric acid. Such alcohols include those having from six to nine carbon atoms and particularly 1-heptanol. Other organic solvents which are immiscible with the mother liquor and have a low or limited solubility for orthophosphoric acid such as kerosene, heptane and other hydrocarbons may also be used.

The resulting crystals are white and assay about 70-72% $P_2O_5$ (theoretical is 72.43% $P_2O_5$) which indicates a purity of 96.7% to 99.4%. Upon dissolving the crystals in water to yield a 75% or 85% phosphoric acid ($H_3PO_4$) solution, the entrained solids therein can cause the solution to become turbid. The turbidity can be removed by centrifuging or by aging to cause settling. Entrained solids can also be removed from crystalline phosphoric acid by melting the crystals and centrifuging or filtering.

It is preferred in the crystallization of orthophosphoric acid to accelerate the crystallization by inoculating the hydrolyzed acid mixture with a seed crystal or crystals of anhydrous orthophosphoric acid.

The residue of mother liquor after crystallization and removal of the crystalline orthophosphoric acid is useful in itself as a liquid fertilizer grade acid.

The superphosphoric acid used in the instant process is not restricted to any specific mixture of polyphosphoric acids and orthophosphoric acid. However, the minumum total $P_2O_5$ content of the acid should be about 62% $P_2O_5$.

The crystallization can be carried out under batch or continuous conditions whereupon partially hydrolyzed superphosphoric acid is continually added to a crystallizer, cooled, and crystallized to obtain pure orthophosphoric acid.

In order to more fully describe the instant invention, the following examples are given.

EXAMPLE 1

Clarified superphosphoric acid analyzing 70.2% $P_2O_5$ and 27.65% poly $P_2O_5$ was diluted with water at 175° F for 1 hour to give a low polyphosphoric acid containing 65.59% $P_2O_5$ and 2.76% poly $P_2O_5$. The hydrolyzed acid was placed in a freezer at −15° F overnight whereupon crystallization resulted. These crystals were twice centrifuged to yield white crystals. Yield was not determined. Chemical analyses of the acids are given below in Table 1.

Table 1

| Component % | SPA Feed[1] | Hydrolyzed SPA | Crystalline Acid | Mother Liquor |
|---|---|---|---|---|
| $P_2O_5$ | 70.20 | 65.59 | 71.07 | 64.72 |
| Poly $P_2O_5$ | 27.65 | 2.76 | — | 4.48 |
| $SO_4$ | 3.37 | 3.21 | 0.56 | 3.92 |
| MgO | 0.44 | 0.39 | 0.08 | 0.50 |
| $Fe_2O_3$ | 1.36 | 1.31 | 0.29 | 1.57 |
| $Al_2O_3$ | 1.02 | 0.96 | 0.19 | 1.11 |
| F | 0.28 | 0.22 | 0.06 | 0.31 |

[1]Superphosphoric acid

EXAMPLE 2

Sixty-three hundred and twenty-six grams of low polyphosphoric acid were prepared for crystallizing by mixing 6225g feed superphosphoric acid as used in Example 1 with 101 grams water at 155° F for several hours. After hydrolysis, the temperature was reduced to 65°-67° F with a tap water bath. When the bulk temperature reached 70° F, seed crystals of orthophosphoric acid were introduced. After stirring at 10rpm for three hours, the batch contained many small crystals. After complete crystallization took place a portion of the crystalline slurry (638 grams) was centrifuged for 5 minutes at approximately 2000 times gravity. The resulting white crystals contained a green tint from the mother liquor. About 66 grams reagent acid (74.5% $P_2O_5$) at ambient room temperature was used to rinse the raw crystals followed by centrifuging for 5 minutes. The resulting crystals were white. Chemical analysis and visual appearance indicated that the mother liquor was a liquid fertilizer grade acid.

Table II

| Component% | SPA Feed | Hydrolyzed SPA | Mother* Liquor | Raw Crystals | Rinsed Crystals | Reagent Rinse |
|---|---|---|---|---|---|---|
| $P_2O_5$ | 69.80 | 65.12 | 59.64 | 70.90 | 72.37 | 74.46 |
| Poly $P_2O_5$ | 28.05 | 3.02 | 0.54 | 11.52 | 2.82 | 28.10 |
| $SO_4$ | 3.92 | 3.65 | 3.84 | 0.08 | 0.06 | — |
| MgO | 0.40 | 0.40 | 0.41 | 0.13 | 0.05 | — |
| $Fe_2O_3$ | 1.22 | 1.16 | 0.71 | 0.30 | 0.04 | — |
| $Al_2O_3$ | 0.99 | 0.02 | 1.00 | 0.19 | 0.02 | — |
| F | 0.28 | 0.22 | 0.26 | 0.07 | 0.06 | — |
| Wt.in Grams | 628 | 638 | 482 | 156 | 109 | 66 |
| Yield %$P_2O_5$ | — | — | — | 26.6 | 19.0 | — |

*Chemical analysis includes reagent rinse. Weight reflects mother liquor weight prior to rinse addition and was determined by weight difference between hydrolyzed SPA and raw crystals.

EXAMPLE 3

Partially hydrolyzed superphosphoric acid was prepared by mixing 5626g superphosphoric acid (69.80% $P_2O_5$, 28.05% poly $P_2O_5$) with 174g. water at 180° F for one hour. After cooling overnight at room temperature the partially hydrolyzed acid was metered continuously into a crystallizer at 10 ml/min. The crystallizer temperature was maintained at approximately 73° F. Three hours after seeding, with orthophosphoric acid, crystals were abundant and the crystalline slurry was highly viscous. A portion of these crystals, 1471g, were removed and centrifuged for 10 minutes to yield whitegray crystals and a clear green mother liquor. The crystals weighed 385g and contained 70.04% $P_2O_5$ to yield 27.1% of the $P_2O_5$ in the crystalline form. The mother liquor, by weight difference, weighed 1086 grams and assayed 57.87% $P_2O_5$ and 0.31% poly $P_2O_5$ and is useful as a fertilizer grade acid.

EXAMPLE 4

Partially hydrolyzed superphosphoric acid was prepared by mixing 3734g superphosphoric acid (69.80% $P_2O_5$, 28.05% poly $P_2O_5$) with 116g water at 170° F for one hour. After cooling to 65° F in a water bath seed crystals of orthophosphoric acid were added. After 4½ hours at 65° F the acid was almost solid. After leaving over 48 hours at 73°-75° F, 2424g of the slurry was centrifuged to yield 434g crystals (70.29% $P_2O_5$) and 1990g mother liquor (59.87% $P_2O_5$ and 0.31% poly $P_2O_5$). The yield of purified $P_2O_5$ was 18.6% by weight.

EXAMPLE 5

A sample of partially hydrolyzed superphosphoric acid (68.66% $P_2O_5$, 14.71% poly $P_2O_5$) was prepared by mixing superphosphoric acid (70.01% $P_2O_5$, 27.92% poly $P_2O_5$) with water in a ratio of 98g acid to 2g water at 175° F for ½ hour. After cooling to room temperature (75° F), seed crystals of orthophosphoric acid were introduced. Upon leaving this overnight, the acid crystallized. A portion of the crystallized acid was centrifuged and the raw crystals were rinsed with approximately 95% $H_3PO_4$ reagent acid. the resulting white crystals were dissolved in water to yield a colorless, turbid acid containing 61.14% $P_2O_5$. Chemical analyses are given in Table III below. Yield was not obtained.

Table III

| Component % | SPA Feed | Hydrolyzed SPA | Diluted Purified Acid |
|---|---|---|---|
| $P_2O_5$ | 70.01 | 68.66 | 61.14 |
| Poly $P_2O_5$ | 27.92 | 14.71 | 0.52 |
| $SO_4$ | 3.68 | — | 0.03 |
| MgO | 0.40 | — | 0.03 |
| $Fe_2O_3$ | — | — | 0.05 |
| $Al_2O_3$ | — | — | 0.04 |
| F | — | — | 0.03 |
| Cd | — | — | 6ppm |
| As | — | — | 0.4 ppm |
| CaO | — | — | Trace |

EXAMPLE 6

On a continuous basis for 24 hours, 12,480g partially hydrolyzed superphosphoric acid (66.4% $P_2O_5$) was fed into an agitated crystallizer. The crystallizer had a temperature gradient of about 4° F with the entrance at 67° F and the outlet at 63° F. Retention time was 6–7 hours. The resulting crystalline slurry was centrifuged to yield 5,153g of crystals assaying 70.4% $P_2O_5$ for a yield of 25.1%. Recrystallization of these raw crystals gave a 42% yield assaying 71.9% $P_2O_5$. Chemical analysis is given in Table IV.

Table IV

| Component % | Hydrolyzed SPA | Raw Crystals | Recrystallized Crystals |
|---|---|---|---|
| $P_2O_5$ | 66.4 | 70.4 | 71.9 |
| Poly $P_2O_5$ | 4.9 | 2.6 | — |
| $SO_4$ | 4.1 | 1.0 | Trace |
| MgO | 0.5 | 0.3 | 0.04 |
| $Fe_2O_3$ | 1.2 | 0.4 | 0.01 |
| $Al_2O_3$ | 1.0 | 0.3 | 0.02 |
| F | 0.3 | 0.05 | 0.01 |
| Yield, % | — | 25.1 | 42 |

The above examples provide specific embodiments of the present invention but do not limit the scope of the disclosure.

Those skilled in the art may vary the techniques and procedures described above as necessary without departing from the ambit of the invention.

We claim:

1. A process for obtaining pure orthophosphoric acid from superphosphoric acid comprising:
    (a) hydrolyzing superphosphoric acid with water until a mixture of polyphosphoric acids and orthophosphoric acid is formed, wherein the total $P_2O_5$ content of said mixture is from 65% to 70% and the poly $P_2O_5$ content of said mixture is from 1% to 15% of the total $P_2O_5$;
    (b) crystallizing said orthophosphoric acid from said mixture;
    (c) separating said orthophosphoric acid from said mixture; and
    (d) washing said orthophosphoric acid with an organic solvent selected from the group consisting of alcohols having six to nine carbon atoms and hydrocarbons having a low or limited solubility for orthophosphoric acid.

2. The process of claim 1 wherein said hydrolysis is conducted by heating said superphosphoric acid with water.

3. The process of claim 1 wherein said crystallization is caused by cooling said mixture below about 75° F.

4. The process of claim 1 wherein said alcohol is 1-heptanol.

5. The process of claim 1 wherein said orthophosphoric acid is separated from said mixture by centrifuging.

6. The process of claim 1 which further comprises adding seed crystals of pure orthophosphoric acid to said mixture of polyphosphoric acids and orthophosphoric acid prior to crystallizing substantially pure orthophosphoric acid from said mixture.

7. The process for the separation of pure orthophosphoric acid from superphosphoric acid which comprises:
    (a) heating superphosphoric acid with water until a mixture of polyphosphoric acids and orthophosphoric acid is formed wherein the total $P_2O_5$ content of said mixture is from 65% to 70% and the poly $P_2O_5$ content of said mixture is from 1 to 15% of the total $P_2O_5$;
    (b) cooling said mixture to below about 75° F to crystallize orthophosphoric acid therefrom;
    (c) centrifuging said mixture to separate substantially pure orthophosphoric acid; and
    (d) washing said orthophosphoric acid with an alcohol having from 6 to 9 carbon atoms.

8. The process of claim 7 wherein said alcohol is 1-heptanol.

9. The process of claim 7 which further comprises adding seed crystals of pure orthophosphoric acid to said mixture of polyphosphoric acid and orthophosphoric acid prior to crystallizing orthophosphoric acid from said mixture.

10. A process for obtaining substantially pure orthophosphoric acid from superphosphoric acid which comprises:
    (a) heating a superphosphoric acid with water at a temperature of about 155° to 185° F until a mixture of orthophosphoric acid and low polyphosphoric acids is formed, containing 65 to 70% total $P_2O_5$ and from 1% to 15% poly $P_2O_5$;
    (b) cooling said mixture to a temperature below about 75° F to crystallize orthophosphoric acid;
    (c) centrifuging said mixture to separate crystals of orthophosphoric acid from said mixture; and
    (d) washing said orthophosphoric acid crystals with an alcohol having from six to nine carbon atoms.

11. The process of claim 10 wherein said superphosphoric acid contains from about 69 to 71% $P_2O_5$.

12. The process of claim 10 wherein said superphosphoric acid is heated with water to a temprature of about 175° F for from ½ to 1 hour.

13. The process of claim 10 which further comprises adding seed crystals of orthophosphoric acid to said mixture of orthophosphoric acid and low polyphosphoric acids after cooling said mixture to initiate crystallization of said orthophosphoric acid.

14. The process of claim 10 wherein said mixture is cooled for from about 1.5 to 10 hours.

15. The process of claim 10 wherein said alcohol is 1-heptanol.

16. The process of claim 9 wherein said mixture of orthophosphoric acid and low polyphosphoric acids contains from 65% to 69% total $P_2O_5$ and from 2.7% to 15% poly $P_2O_5$.

17. A process for obtaining substantially pure orthophosphoric acid from a superphosphoric acid which comprises:
    (a) heating a superphosphoric acid containing from about 69% to 71% $P_2O_5$ with water at a temperature from about 155° to 185° C for from about ½ to 1 hour to form a mixture of orthophosphoric acid and low polyphosphoric acids containing 65–70% total $P_2O_5$ and from 1% to 15% poly $P_2O_5$;

(b) cooling said mixture to a temperature below about 75° F;

(c) adding seed crystals of anhydrous orthophosphoric acid to said mixture to initiate crystallization of orthophosphoric acid;

(d) maintaining said mixture at a temperature below about 75° F for from about 1.5 to 10 hours to complete the crystallization of said orthophosphoric acid;

(e) centrifuging said mixture to separate crystals of orthophosphoric acid from said mixture; and (f) washing said orthophosphoric acid crystals with 1-heptanol.

18. The process of claim 17 wherein said mixture of orthophosphoric acid and polyphosphoric acids contains from about 65% to 69% total $P_2O_5$ from about 2.7% to 15% poly $P_2O_5$.

* * * * *

UNITED STATES PATENT AND TRADEMARK OFFICE
CERTIFICATE OF CORRECTION

PATENT NO. : 4,083,934
DATED : April 11, 1978
INVENTOR(S) : John D. Jernigan and Brooks M. Whitehurst It is certified that error appears in the above-identified patent and that said Letters Patent are hereby corrected as shown below:

Col. 1, line 16 change "orthophosphoric" to --Orthophosphoric--.

Col. 1, line 20 change "orthophosphoric" to --Orthophosphoric--.

Col. 1, line 63 after "ion-exchange" insert --and--.

Col. 3, line 53 after "grams" insert --(6326g)--.

Col. 4, line 64 change "the" to --The--.

Col. 6, line 9 change "The" to --A--.

Col. 6, line 48 change "to" to --at-- and change "temprature" to --temperature--.

Signed and Sealed this

Twelfth Day of September 1978

[SEAL]

Attest:

RUTH C. MASON
Attesting Officer

DONALD W. BANNER
Commissioner of Patents and Trademarks